No. 752,031. PATENTED FEB. 16, 1904.
L. S. CHADWICK.
FOLDING STEP FOR VEHICLES.
APPLICATION FILED APR. 23, 1903.
NO MODEL.

WITNESSES:
W. W. Canby
M. M. Hamilton

INVENTOR
Lee S. Chadwick
BY
Harding & Harding
ATTORNEYS

No. 752,031.

Patented February 16, 1904.

UNITED STATES PATENT OFFICE.

LEE S. CHADWICK, OF RIDLEY PARK, PENNSYLVANIA.

FOLDING STEP FOR VEHICLES.

SPECIFICATION forming part of Letters Patent No. 752,031, dated February 16, 1904.

Application filed April 23, 1903. Serial No. 153,954. (No model.)

*To all whom it may concern:*

Be it known that I, LEE S. CHADWICK, a citizen of the United States, residing at Ridley Park, county of Delaware, and State of Pennsylvania, have invented a new and useful Improvement in Automatic Folding Steps for Vehicles, of which the following is a full, clear, and exact description, reference being had to the accompanying drawings, which form a part of this specification.

My invention has for its object the production of a folding step for vehicles which will automatically open when the vehicle-door is open and be closed or folded when the vehicle-door is closed.

My invention consists in certain mechanism whereby the result is obtained with simplicity and certainty.

I will first describe the embodiment of my invention illustrated in the accompanying drawings and then point out the invention in the claims.

Figure 1:
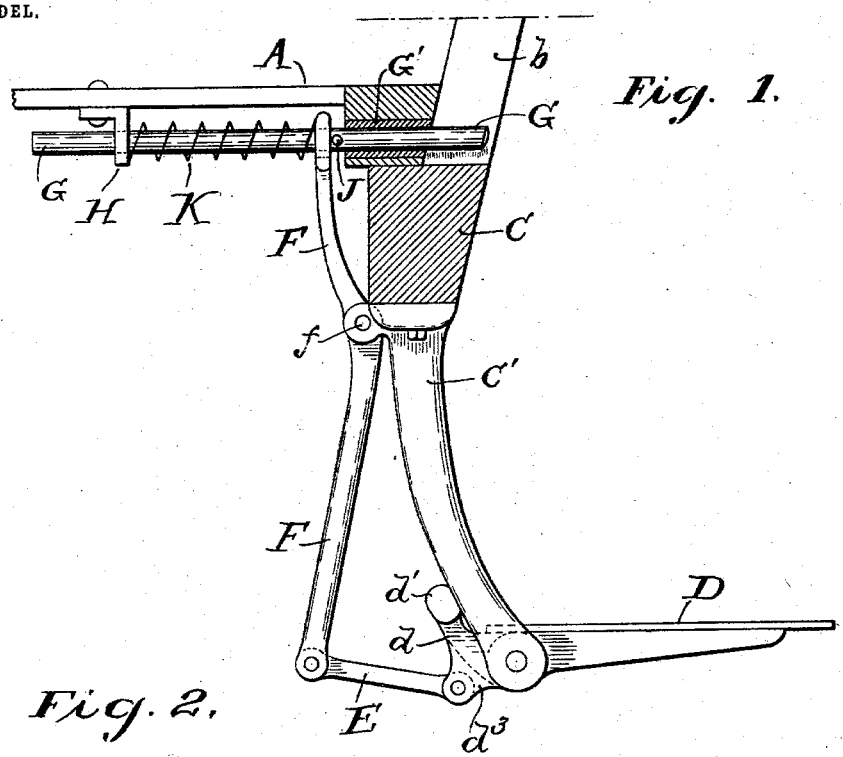
Figure 2:
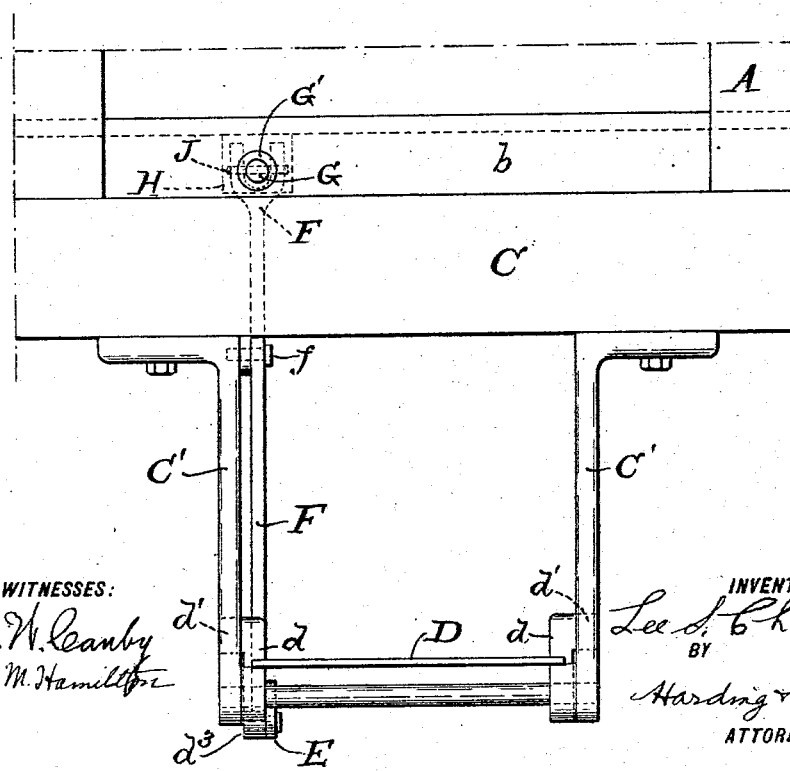

In the drawings, Figure 1 is a side view of step with the frame of the vehicle sectioned. Fig. 2 is a front view of step and door-jamb.

A is the vehicle, $b$ the door-jamb.

C is the back rail or frame of the vehicle.

Secured to the back rail or frame $c$ are the brackets C', to which the step D is pivotally attached, the step D, having the rearwardly-projecting portions $d$ beyond the pivot, provided at its ends with the lugs $d'$ in line with bracket C'. The projecting portion $d$ has the ear $d^3$. Pivotally attached to the ear $d^3$ is the link E, connecting with the lever F, pivoted at $f$ to the bracket C'. The upper end of the lever F surrounds the rod G. This rod G is supported so as to be movable longitudinally, being supported at one end by a hanger H and at the other end passing through a tube G' in an orifice in the vehicle-body and in one position being within the door-jamb. A spring K surrounds this rod between the hanger H and the end of the lever F. On the rod G beyond the lever F is a pin J, said pin resting against said lever. When the door is opened, the rod and lever through the action of the spring move into the open position. (Shown in Fig. 1.) When the door is closed, it in passing over the jamb-space strikes and moves the rod G, and through the medium of the pin J the lever F, link E, and step D into the closed position. The movement of the lever F when the door is opened turns the step D into the position shown in Fig. 1. In this position the lug $d'$ contacts with bracket C', limiting the movement of the step.

By the construction hereinbefore described I provide a simple and durable automatic folding step which is well adapted for use with automobiles, where it is essential that there should be no projection from the vehicle when it is in motion and yet when the vehicle is at rest there shall be a projecting step. This construction acts with certainty, as the opening of the door is necessary to project the step and the closing of the door withdraws the step.

Having now fully described my invention, what I claim, and desire to protect by Letters Patent, is—

1. In combination with a vehicle, of a hinged or pivoted step, a lever connected to said step, a horizontally-movable rod, a pin upon said rod in line with said lever.

2. In combination with a vehicle, of a hinged or pivoted step, a lever connected to said step, a horizontally-movable rod, a pin upon said rod in line with said lever, and a spring surrounding said rod and resting against said lever on the side opposite the pin.

3. In combination with a vehicle, of a door, a horizontally-movable rod, a spring tending to move said rod in one direction, said rod being in line of movement of said door, a lever, connection between said lever and the rod, a pivoted step, said lever being connected with said step.

4. In combination with a vehicle, of a door, a horizontally-movable rod in line with said door, a pin upon said rod, a lever surrounding said rod in line with said pin, a spring surrounding said rod on the side of said lever opposite to the pin, a pivoted step, said lever being connected to said step.

5. In combination with a vehicle, of a bracket secured thereto, a step pivoted to said bracket, a lever connected to said step, a horizontally-moving rod, a pin on said rod resting against one side of said lever and a spring acting on the opposite side of said lever.

6. In combination with a vehicle having a door, of a bracket secured thereto, a step pivoted to said bracket, a lever connected to said step, a horizontally-moving rod, connection between said rod and lever, a spring tending to move said lever in one direction, said lever being moved by said rod against the action of said spring, said rod being in line of movement of said door.

7. In combination with a vehicle having a door, of a bracket secured thereto, a step pivoted to said bracket, said step having a rearwardly-projecting portion in line with said bracket, a lever connected to said step, a horizontally-moving rod, connection between said rod and lever, a spring tending to move said lever in one direction, said lever being moved by said rod against the action of said spring, said rod being in line of movement of said door.

8. In combination with a vehicle, having a door, of a bracket secured thereto, a step pivoted to said bracket, a lever connected to said step, a horizontally-moving rod, a pin on said rod resting against one side of said lever and a spring acting on the opposite side of said lever, said rod being in line of movement of said door.

9. In combination with a vehicle, of a bracket secured thereto, a step pivoted to said bracket, said step having a rearwardly-projecting portion in line with said bracket, a lever connected to said step, a horizontally-moving rod, a pin on said rod resting against one side of said lever and a spring acting on the opposite side of said lever, connection between said rod and lever.

10. In combination with a vehicle having a door, of a bracket secured thereto, a step pivoted to said bracket, said step having a rearwardly-projecting portion in line with said bracket, a lever connected to said step, a horizontally-moving rod, a pin on said rod resting against one side of said lever and a spring acting on the opposite side of said lever, connection between said rod and lever, said rod being in line of movement of said door.

In testimony of which invention I have hereunto set my hand, at Trainer, Pennsylvania, on this 15th day of April, 1903.

LEE S. CHADWICK.

Witnesses:
C. W. ROWE,
GEO. B. HARVEY.